US012685933B2

(12) United States Patent
Xu et al.

(10) Patent No.: US 12,685,933 B2
(45) Date of Patent: Jul. 21, 2026

(54) LIVE VIDEO-BASED INTERACTION METHOD AND APPARATUS, DEVICE AND STORAGE MEDIUM

(71) Applicant: Tencent Technology (Shenzhen) Company Limited, Shenzhen (CN)

(72) Inventors: Dongbo Xu, Shenzhen (CN); Qintong Cai, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 315 days.

(21) Appl. No.: 18/199,064

(22) Filed: May 18, 2023

(65) Prior Publication Data

US 2023/0285854 A1 Sep. 14, 2023

Related U.S. Application Data

(63) Continuation of application No. PCT/CN2022/099336, filed on Jun. 17, 2022.

(30) Foreign Application Priority Data

Jul. 6, 2021 (CN) .......................... 202110762550.7

(51) Int. Cl.
A63F 13/497 (2014.01)
A63F 13/533 (2014.01)
(Continued)

(52) U.S. Cl.
CPC .......... *A63F 13/497* (2014.09); *A63F 13/533* (2014.09); *A63F 13/86* (2014.09); *H04N 21/2187* (2013.01); *H04N 21/4314* (2013.01)

(58) Field of Classification Search
CPC ............................... A63F 13/497; A63F 13/86
See application file for complete search history.

(56) References Cited

U.S. PATENT DOCUMENTS 8,370,753 B2 2/2013 Bannister et al.
9,454,993 B1 9/2016 Lawson et al.
(Continued)

FOREIGN PATENT DOCUMENTS

CN 105872573 A 8/2016
CN 108924576 A 11/2018
(Continued)

OTHER PUBLICATIONS

Chinese office action issued on CN202110762550.7 dated Mar. 9, 2022, including an English Concise Explanation (9 pages).
(Continued)

*Primary Examiner* — Jay Trent Liddle
(74) *Attorney, Agent, or Firm* — Crowell & Moring LLP

(57) ABSTRACT

A live video-based interaction method and apparatus, a device and a storage medium, related to the field of livestreaming programs. The method includes: displaying a playback interface of a live video, the playback interface used to play a live video; displaying a node indication area in the playback interface in response to a video content of the live video conforming to an event excerpting condition, the event excerpting condition used to indicate division of an event node; displaying child node information in the node indication area, the child node information used to indicate correspondence to the divided event node, triggering display of a child node of the video content; and displaying an interaction result based on an interaction operation in response to receiving the interaction operation from the node indication area.

20 Claims, 11 Drawing Sheets

(51) Int. Cl.
   *A63F 13/86*        (2014.01)
   *H04N 21/2187*      (2011.01)
   *H04N 21/431*       (2011.01)

(56)              References Cited

U.S. PATENT DOCUMENTS

| | | | |
|---|---|---|---|
| 10,661,171 | B2 | 5/2020 | Chen et al. |
| 2014/0113718 | A1* | 4/2014 | Norman ................ A63F 13/822 |
| | | | 463/31 |
| 2017/0282071 | A1* | 10/2017 | Kurabayashi ....... G06F 3/04847 |
| 2018/0021684 | A1* | 1/2018 | Benedetto .............. A63F 13/86 |
| | | | 463/24 |
| 2020/0021894 | A1 | 1/2020 | Sanchez et al. |
| 2020/0179812 | A1* | 6/2020 | Trombetta .......... A63F 13/5252 |
| 2020/0197804 | A1* | 6/2020 | Perlman ................ A63F 13/335 |
| 2020/0245019 | A1* | 7/2020 | Yin ........................ A63F 13/45 |
| 2021/0129023 | A1* | 5/2021 | Jarzebinski ........... A63F 13/497 |
| 2022/0203228 | A1* | 6/2022 | Wiggeshoff ............. A63F 13/86 |

FOREIGN PATENT DOCUMENTS

| | | | |
|---|---|---|---|
| CN | 111131876 | A | 5/2020 |
| CN | 111147878 | A | 5/2020 |
| CN | 111918085 | A | 11/2020 |
| CN | 112533008 | A | 3/2021 |
| CN | 112822504 | A | 5/2021 |
| CN | 113490010 | A | 10/2021 |
| JP | 2009-187526 | A | 8/2009 |
| JP | 2018-525050 | A | 9/2018 |
| JP | 2019-523596 | A | 8/2019 |
| WO | WO 2018/017428 | A1 | 1/2018 |

OTHER PUBLICATIONS

International Search Report and Written Opinion of PCT/CN2022/099336 issued on Jul. 21, 2022, including translations (9 pages).
Office Action issued in Japanese Patent Application No. 2023-555814 dated Sep. 26, 2024, w/English translation, 14 pages.

* cited by examiner

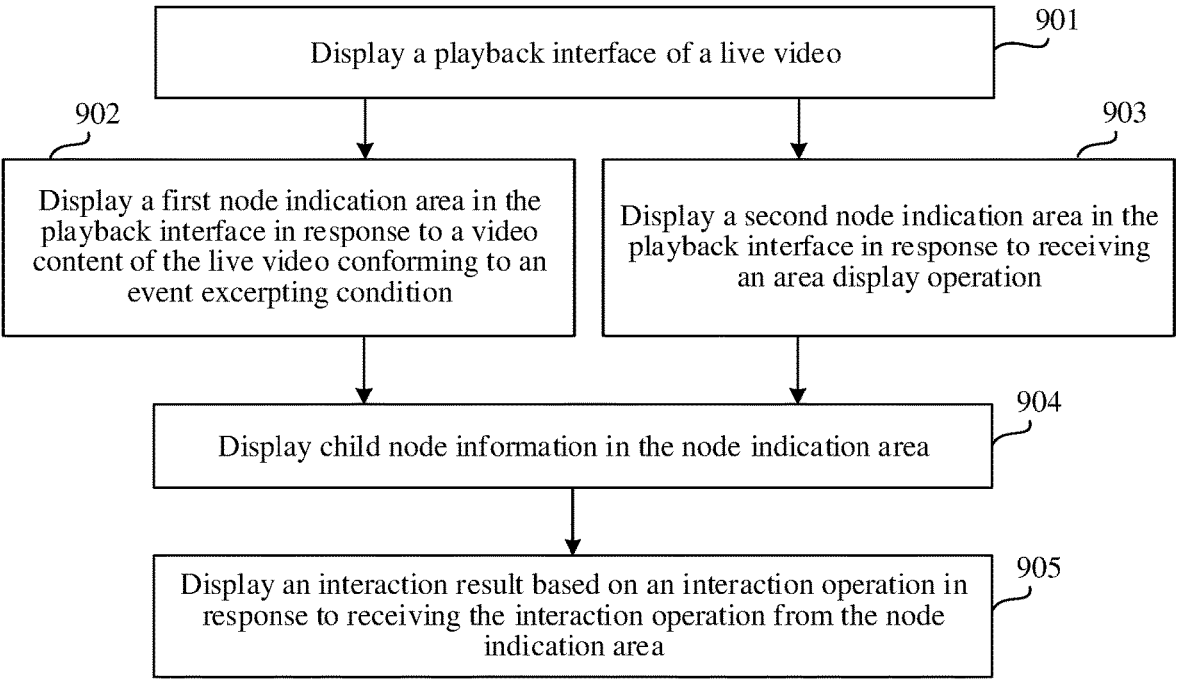

Display a playback interface of a live video          901

Display a first node indication area in the playback interface in response to a video content of the live video conforming to an event excerpting condition          902

Display a second node indication area in the playback interface in response to receiving an area display operation          903

Display child node information in the node indication area          904

Display an interaction result based on an interaction operation in response to receiving the interaction operation from the node indication area          905

FIG. 9

A livestreamer terminal uploads player operation information          1101

A game server determines whether a kill highlight is triggered          1102

No

Yes

The game server delivers the player operation information before a kill highlight to the livestreaming terminal          1103

The livestreaming terminal displays the delivered information          1104

A livestreaming terminal user long-presses a screen — 1201

The livestreaming terminal requests the game server for the kill highlight information — 1202

The game server delivers historic kill highlight information, operation information, and screen recording information — 1203

Display the livestreaming terminal interface — 1204

LIVE VIDEO-BASED INTERACTION METHOD AND APPARATUS, DEVICE AND STORAGE MEDIUM

RELATED APPLICATION

This application is a continuation of International Application No. PCT/CN2022/099336, filed on Jun. 17, 2022, which claims priority to Chinese Patent Application No. 202110762550.7, filed on Jul. 6, 2021 and entitled "LIVE VIDEO-BASED INTERACTION METHOD AND APPARATUS, DEVICE AND STORAGE MEDIUM". The contents of International Application No. PCT/CN2022/099336 and Chinese Patent Application No. 202110762550.7 are each incorporated herein by reference in their entirety.

FIELD OF THE TECHNOLOGY

Embodiments of this application relate to the field of livestreaming programs, and in particular, to a live video-based interaction method and apparatus, a device and a storage medium.

BACKGROUND OF THE DISCLOSURE

A livestreaming application is an application that provides a livestreamer account with a livestreaming platform and provides a viewer account with a live video, that is, a user may log in the livestreaming application with the account to start live streaming, and use the account to view live streaming.

In related technologies, in a livestreaming application, a user may interact with a livestreamer account by watching the live video, and transmit a private message to the livestreamer account in a chat dialog box, and the livestreamer account may view the private message in the chat dialog box and optionally reply to the chat message.

However, among the above approaches, for the viewer account, the interaction with the live video only exists as watching the live video, the interaction approach is relatively single, and the information transmission effect of the live video is poor.

SUMMARY

Embodiments of this application provide a live video-based interaction method and apparatus, a device and a storage medium, capable of improving the diversity of interaction approaches between a viewer account and a live video in a livestreaming application. The technical solutions are as follows:

In one embodiment, a live video-based interaction method, executed by a terminal device, includes:

displaying a playback interface of a live video, the playback interface being used for playing the live video;

displaying a node indication area in the playback interface in response to a video content of the live video conforming to an event excerpting condition, the event excerpting condition being used for indicating division of an event node in the live video based on the video content;

displaying child node information in the node indication area, the child node information being used for indicating correspondence to the divided event node, and triggering display of a child node of the video content, the child node being used for indicating an operation corresponding to the event node; and displaying an interaction result based on an interaction operation in response to receiving the interaction operation on the node indication area.

In another embodiment, a live video-based interaction apparatus includes:

a display module, configured to display a playback interface of a live video, the playback interface being used for playing the live video;

the display module, further configured to display a node indication area in the playback interface in response to a video content of the live video conforming to an event excerpting condition, the event excerpting condition being used for indicating division of an event node in the live video based on the video content;

the display module, further configured to display child node information in the node indication area, the child node information being used for indicating correspondence to the divided event node, and trigger display of a child node of the video content, the child node being used for indicating an operation corresponding to the event node; and a receiving module, configured to receive an interaction operation from the node indication area.

The display module is further configured to display an interaction result based on an interaction operation.

In other embodiments, a computer device includes a processor and a memory. The memory stores at least one instruction, at least one program, a code set or an instruction set. The at least one instruction, the at least one program, the code set or the instruction set is loaded and executed by the processor to implement the live video-based interaction method according to any one of the foregoing embodiments of this application.

In other embodiments, a computer-readable storage medium has at least one instruction, at least one program, a code set or an instruction set stored thereon. The at least one instruction, the at least one program, the code set or the instruction set is loaded and executed by a processor to implement the live video-based interaction methods according to any one of the foregoing embodiments of this application.

In other embodiments a computer program product or a computer program includes computer instructions stored in a computer-readable storage medium. A processor of a computer device reads the computer instruction from the computer-readable storage medium. The processor executes the computer instruction so that the computer device executes the live video-based interaction method according to any one of the foregoing embodiments.

Beneficial effects brought by the technical solutions in the embodiments of this application at least include the following:

by displaying the node implication area in event that the video content conforms to the event excerpting condition, the livestreaming condition of the current live video is indicated with the node implication area, the form of interaction between the viewer and the live video is enriched, and the viewer may learn the video content and livestreaming condition in the node indication area, and further interact in the node indication area, which improves the interaction efficiency between the viewer and the live video.

BRIEF DESCRIPTION OF THE DRAWINGS

FIG. 9 is another flowchart of a live video-based interaction method according to an exemplary embodiment of this application.

DESCRIPTION OF EMBODIMENTS

Figure 1:
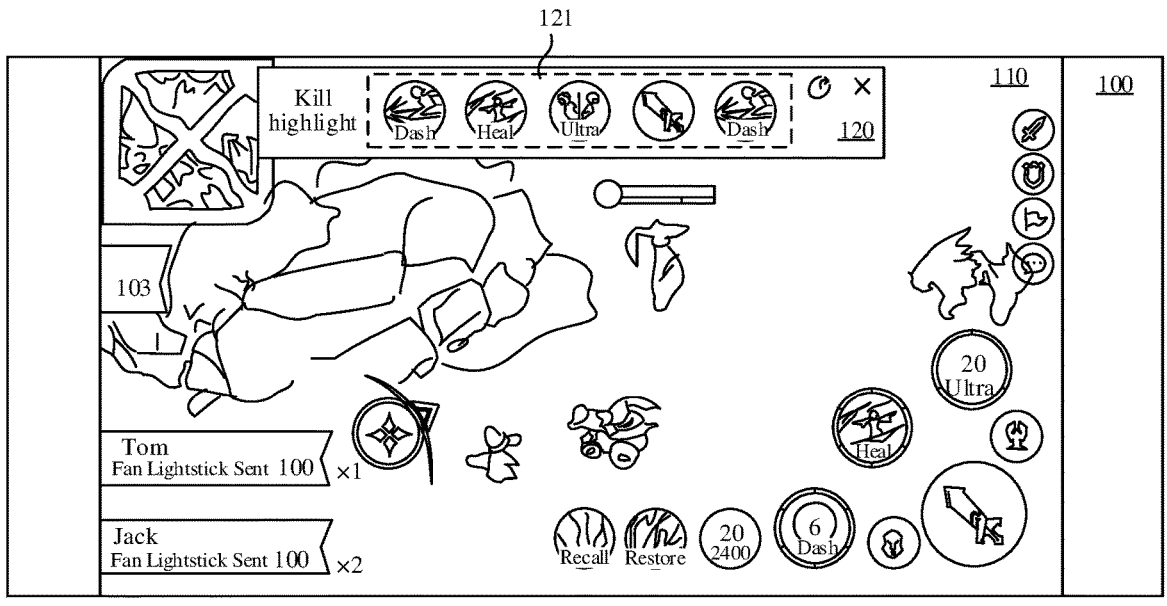
FIG. 1 is a schematic diagram of a livestreaming interface according to an exemplary embodiment of this application.

To make the objectives, technical solutions, and advantages of this application clearer, the following further describes implementations of this application in detail with reference to the accompanying drawings.

First, a brief introduction to terms involved in embodiments of this application is listed as follows:

Livestreaming refers to a technology of collecting host data by a device, converting it into a transmittable video stream through a series of treatments, and finally outputting it to a viewing terminal device for playback, for example, a video is subjected to coding compression processing and converted into a video stream. A livestreaming application according to the embodiments of this application refers to an application that provides a We-Media platform. That is, a user can create a livestreaming room with him/her as a livestreamer after registering to this livestreaming application. Creation of the livestreaming room includes or does not include a condition restriction. In some embodiments, a user account creates a livestreaming room for livestreaming by applying for eligibility. In other embodiments, the user account chooses to start livestreaming directly in a user interface of a livestreaming application. After livestreaming room information is filled in, a livestreaming room is created for livestreaming. In some embodiments, the user account may also serve as a viewer account for viewing a live video of a livestreamer account.

In the embodiments of this application, for the video content in the live video, in event that a video content conforms to an event excerpting condition, an event node is divided in the live video, and a node indication area is displayed according to the divided event node, and the divided event node is shown.

Taking a live video being implemented as a game live video as an example, the event excerpting condition is implemented as a kill highlight of the livestreamer account, that is, a moment of 'One Kill', 'Triple Kill', 'Quadra Kill', or 'Penta Kill' in a game. In some embodiments, the kill highlight is obtained by a terminal device performing picture recognition on a video content in a playback interface, or the kill highlight is determined by a server transmitting an indication to the terminal device according to game data. In event that the livestreamer account completes the kill highlight in the game, an event node is divided at the kill highlight of the live video, and a node indication area corresponding to the kill highlight is displayed. Operation child nodes executed in the process of completing the kill highlight in the livestreamer account is displayed in the node indication area. For example, the livestreamer account completes the kill highlight through operation a, operation b and operation c, a child node of operation a, a child node of operation b and a child node of operation c are displayed in the node indication area corresponding to the kill highlight.

In some embodiments, the operation child nodes are displayed in the form of an operation icon, or the operation child nodes are displayed in the form of an operation name, which is not limited in the embodiments of this application.

For example, FIG. 1 illustrates a schematic diagram of a livestreaming interface according to an exemplary embodiment of this application. As shown in FIG. 1, a livestreaming interface 100 includes a video picture 110 and a node indication area 120. The node indication area 120 is an area displayed when the livestreamer account completes a kill highlight in the game. The node indication area 120 displays operation child nodes 121 configured to indicate operations executed by the livestreamer account the process of completing the kill highlight. As can be seen from the operation child nodes 121 shown in FIG. 1, the livestreamer account implements a kill highlight via a series of operations, such as a dash operation, a heal operation, an ultra operation, and an attack operation.

Figure 2:
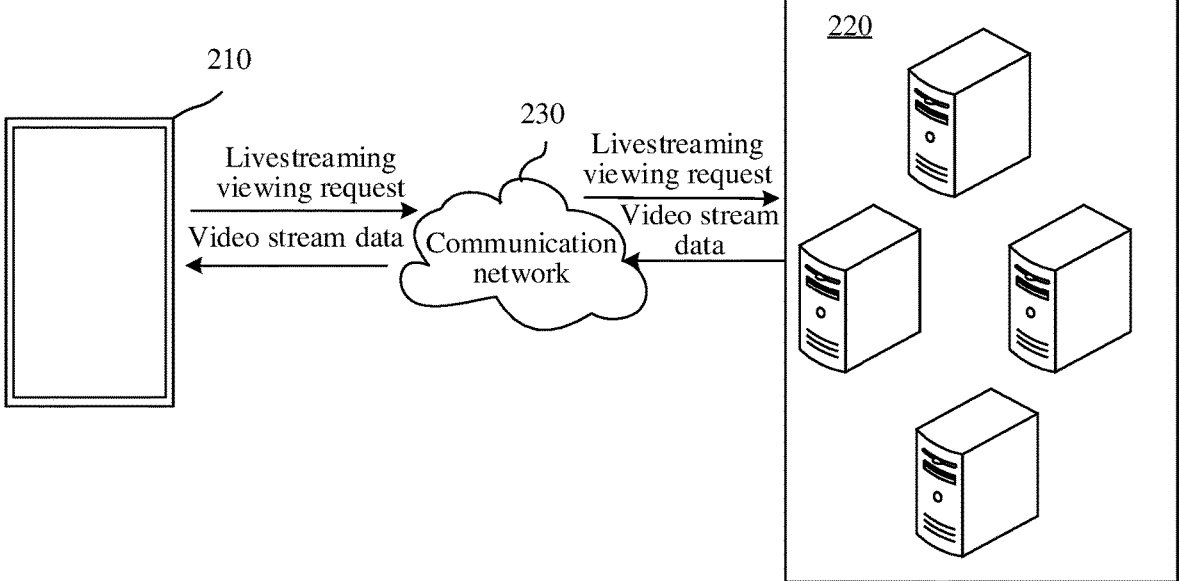
FIG. 2 is a schematic diagram of an implementation environment according to an exemplary embodiment of this application.

FIG. 2 is a schematic diagram of an implementation environment according to an exemplary embodiment of this application. As shown in FIG. 2, the implementation environment includes a terminal device 210 and a server 220. The terminal device 210 and the server 220 are connected through a communication network 230.

The terminal device 210 is installed with the livestreaming application according to the embodiments of this application, and the livestreaming application provides the function of displaying a node indication area. That is, when using a livestreaming application on the terminal device 210, a user can view a live video via the livestreaming application. In the viewing process of the live video, a node indication area is displayed when a video content of the live video conforms to an event excerpting condition.

The server 220 is configured to receive video stream data of the live video from a host terminal, and transmit the video stream data to a viewer terminal to play the live video.

Figures 3, 4:
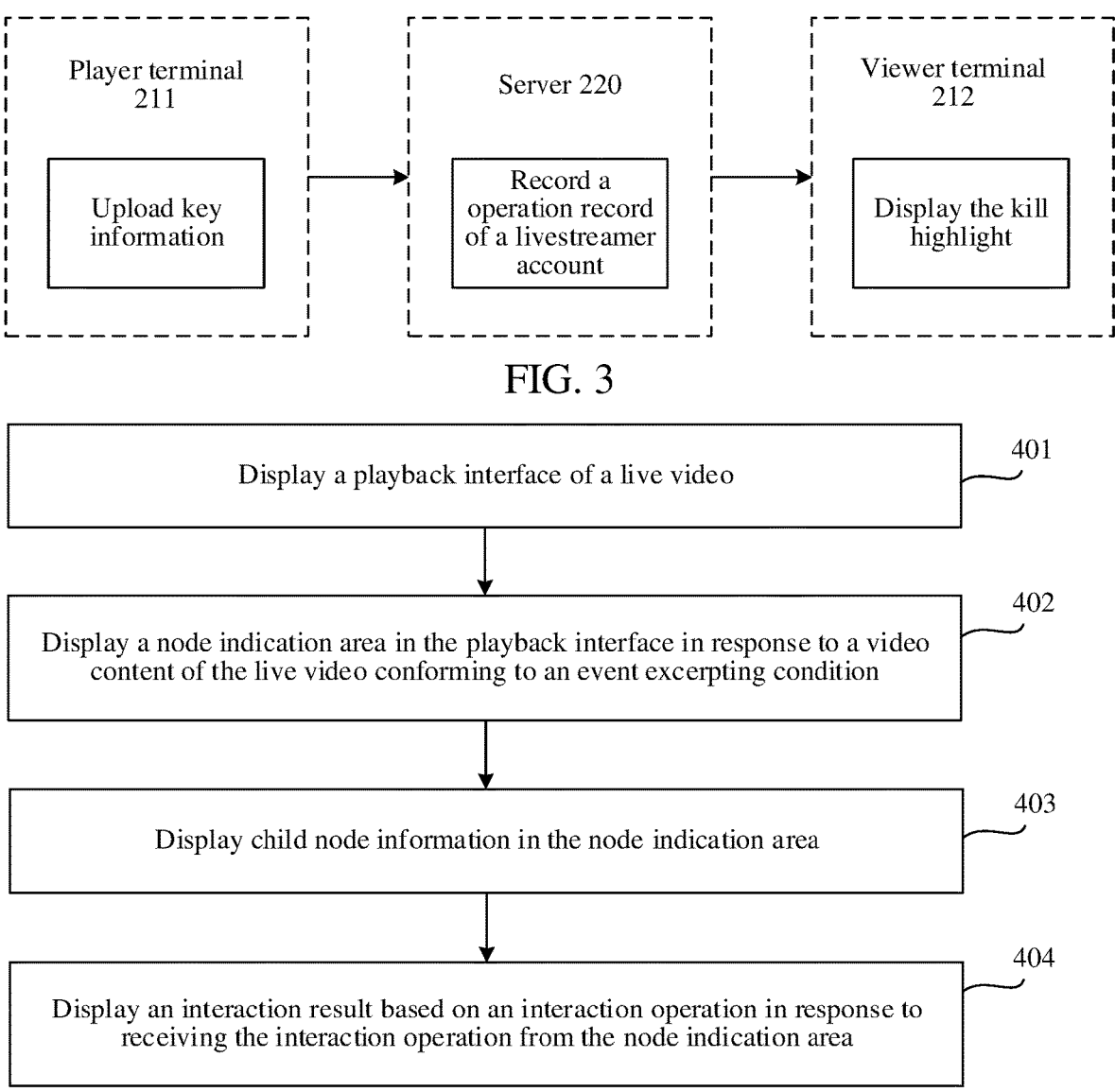
FIG. 3 is a schematic diagram of an overall architecture according to an exemplary embodiment of this application.
FIG. 4 is a flowchart of a live video-based interaction method according to an exemplary embodiment of this application.

In some embodiments, in event that the live video is implemented as a game live video, since it is required to display the operation child nodes produced before the livestreamer account triggers the kill highlight in the node indication area, that is, it is required to record operations executed by the livestreamer account in the game, as shown in FIG. 3, the terminal device 210 includes a player terminal device 211 and a viewer terminal device 212. The player terminal 211 refers to a terminal device operated by the livestreamer account, and the viewer terminal 212 refers to a terminal device used for viewing the live video of the livestreamer account. The player terminal 211 uploads key information onto the server 220, so that the server 220 records operation records of the livestreamer account, and displays a kill highlight operation to the viewer terminal 212 once the kill highlight is triggered.

Taking the game live video as an example, the player terminal 211 uploads each piece of operation information onto the server 220, and the server 220 stores player operation information in a data structure. For example, the server 220 stores 50 recent player operations.

The terminal device includes, but is not limited to a smart phone, a tablet PC, a laptop, a desktop computer, a smart speaker, and a smart watch, etc. The terminal device is directly or indirectly connected to the server via wired or wireless communications, which is not limited in this application.

The server refers to an independent physical server, a server cluster or distributed system composed of multiple physical servers, and a cloud server providing basic cloud computing services, such as cloud services, cloud databases, cloud computing, cloud functions, network services, cloud communications, middleware services, domain name services, security services, Content Delivery Networks (CDN), big data and artificial intelligence platforms.

Cloud technology refers to a hosting technology that integrates resources, such as hardware, software and networks, to implement data computing, storage, processing and sharing in a wide area network or local area network. Cloud technology is a general term of network technologies, information technologies, integration technologies, management platform technologies, application technologies and other technologies applied to a cloud computing business model, and creates a resource pool to satisfy what is needed in a flexible and convenient manner. Cloud computing technologies may be the backbone. A lot of computing resources and storage resources are needed for background services in a technical network system, such as video websites, picture websites and more portal websites. With advanced development and application of the Internet industry, each object is likely to have a recognition flag. These flags need to be transmitted to a background system for logical processing, and data at different levels may be processed separately. Therefore, data processing in all industries requires a strong system to support, and is implemented only through cloud computing technologies.

In some embodiments, the servers may also be implemented as nodes in a blockchain system. Blockchain is a new application mode of computer technologies, such as distributed data storage, peer-to-peer transmission, consensus mechanism and encryption algorithm. Blockchain is essentially a decentralized database or a string of data blocks produced by employing cryptographic methods. Each data block contains a batch of network transaction information to verify information validity (anti-counterfeiting) and generate a next block. Blockchain includes a blockchain underlying platform, a platform product service layer, and an application service layer.

In combination with the term introduction above and the implementation environment, the following describes a live video-based interaction method executed by a terminal device as show in FIG. 2 according to embodiments of this application. As shown in FIG. 4, the method includes the following steps (S401-S404):

Step 401: Display a playback interface of a live video.

The playback interface is used for playing the live video.

In some embodiments, a video frame picture includes a picture collected by a livestreamer terminal or a picture generated by a livestreamer terminal. For example, in event that the live video refers to a show video of a livestreamer user, the video frame picture includes the picture collected by a camera of the livestreamer terminal. In event that the live video refers to a game competitive video of the livestreamer user, the video frame picture includes the game picture displayed by the livestreamer terminal itself.

The live video includes at least one of the following:

First, the live video is a show video. That is, a livestreamer makes a show within the collection range of the terminal camera. Then, the livestreamer terminal collects show data of the livestreamer via the camera, uploads the show video to a server. Finally, the server transmits the show video as the live video to the viewer terminal for playback.

Second, the live video is a game video. After the livestreamer performs a game operation on the livestreamer terminal, and a game process interface displayed on the livestreamer terminal is uploaded to the server, the server transmits a combination of the game video and other display parameters to the viewer terminal for playback.

Third, the live video is a teaching video. The livestreamer performs teaching interpretation on the livestreamer terminal with slides or other teaching materials. The livestreamer interpretation picture is collected via the camera, then the video collected by the camera and the content displayed in the slides or other teaching materials on the terminal device are uploaded to the server, and finally, the server integrates and transmits the interpretation video and teaching materials to a viewer terminal for playback.

The foregoing forms of the live video are merely examples, and the specific forms of the live video are not limited in the embodiments of this application.

Step 402: Display a node indication area in the playback interface in response to a video content of the live video conforming to an event excerpting condition.

The event excerpting condition is used for indicating division of an event node in the live video based on the video content.

The approach of the terminal device dividing the event node includes at least one of the following:

1. The terminal device performs real-time image recognition on an interface content. When recognizing that the interface content includes the specified content corresponding to the event excerpting condition, the event node is divided in the live video.

For example, the terminal device recognizes the interface content of the playback interface. When recognizing that the interface content includes a keyword such as "triple-kill", the event node is divided in the live video at a moment when the keyword appears.

2. The server transmits node division information to the terminal device according to livestreaming data. After receiving the node division information, the terminal device divides the event node according to the node division information.

For example, a game server of the game run by the terminal device generates game data according to the game process and transmits the game data to a livestreaming server. In event that the game data received by the livestreaming server from the game server indicates that the livestreamer terminal defeats three players consecutively, the node division information is generated, indicating that the terminal device divides the event node at a moment when the livestreaming server receives the game data.

3. The terminal device obtains livestreaming process data from the server, and divides the event node according to the livestreaming process data.

For example, taking the game live video as an example, the terminal device requests the game server to transmit a specified type of data in the game process to the terminal device. In the event that the terminal device receives the specified type of data from the server, the event node is divided in the live video according to the specified type of data.

The foregoing approaches of dividing the event node are merely examples, and the specific approaches of dividing the event node are not limited in the embodiments of this application.

The node indication area is an area displayed on the playback interface in a superimposed manner, or the node indication area is an area divided from the playback interface.

In some embodiments, the node indication area is displayed in a boundary position of the playback interface, such as an upper boundary, a lower boundary, a left boundary, or a right boundary.

In some embodiments, the node indication area is directly displayed in event that the video content of the live video conforms to the event excerpting condition and the event node is divided; or, the node indication area is displayed in event that the event node is divided and an area display operation is received.

For example, in event that the livestreamer account reaches the kill highlight in the game, the node indication area is displayed in the upper boundary and/or the lower boundary of the playback interface; or in event that a long-press operation is received on the playback interface, the node indication area is displayed in the left boundary and/or the right boundary of the playback interface based on the long-press operation.

In some embodiments, the live video refers to a game live video in which the livestreamer account participates in a game, the node indication area is displayed in the playback interface in response to the video content of the game live video instructing the livestreamer account to complete a target task in the game.

Step 403: Display child node information in the node indication area.

The child node information is used for indicating correspondence to the divided event node, and triggering display of a child node of the video content. That is, a plurality of child nodes are involved in the process of displaying the video content.

An implementation of the child node includes at least one of the following:

1. The live video is a game live video, and the event node is used for indicating nodes where the livestreamer reaches the kill highlight, then the child nodes are game operations executed in the process that the livestreamer reaches the kill highlight. For example, the livestreamer achieves the kill highlight through operation a, operation b, and operation c. In this case, the child nodes refer to a child node of operation a, a child node of operation b, and a child node of operation c. That is, the child nodes are used for indicating operations corresponding to the event node.

2. The live video is a video of teaching interpretation, and the event node is used for indicating the teaching interpretation reaching the beginning or the end of a chapter. For example, taking the event node being used for indicating the teaching interpretation reaching the end of the chapter as an example, the child note refers to a section title of the recent chapter of teaching interpretation.

The foregoing conditions of the child nodes are merely examples, and the implementation solutions of the child nodes are not limited in the embodiments of this application.

In some embodiments, the child nodes are sequentially arranged and displayed in the node indication area.

Taking the game live video as an example, the operation child nodes are displayed in the node indication area. The operation child nodes are used for indicating the operations executed by the livestreamer account in the process of completing the target task. Optionally, the operation child nodes are displayed in the node indication area. The operation child nodes are used for indicating the operations executed by the livestreamer account in the process of completing the target task. The order of operations executed by the target account in the process of completing the target task is determined, and the operation child nodes corresponding to the operations are sequentially displayed in the node indication area based on the order of operations.

In some embodiments, the node indication area further includes the moment when the livestreamer account completes the target task, or, the node indication area further includes the game character used by the livestreamer account for completing the target task.

Figure 5:
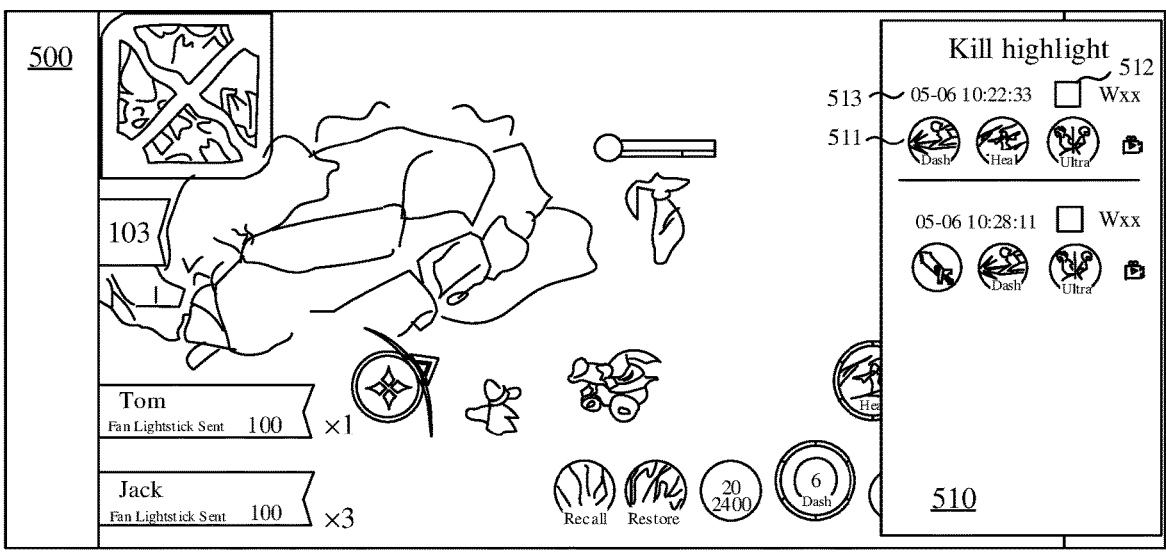
FIG. 5 is a schematic diagram of a playback interface according to the embodiment as shown in FIG. 4.

For example, FIG. 5 is a schematic diagram of a playback interface according to an exemplary embodiment of this application. As shown in FIG. 5, the playback interface 500 includes a node indication area 510. The node indication area 510 is used for indicating the divided event node of the kill highlight in the game of the livestreamer account. The node indication area 510 includes operation child nodes 511 executed by the livestreamer account before the kill highlight, a game character 512 used by the livestreamer account for completing the kill highlight, and a moment 513 when the livestreamer account completes this single kill highlight.

Step 404: Display an interaction result based on an interaction operation in response to receiving the interaction operation from the node indication area.

In some embodiments, the interaction operation includes operations such as closing the node indication area, sharing the node indication area, playing back a video clip corresponding to the node indication area.

In some embodiments, taking the game live video as an example, in response to receiving a first interaction operation for a certain operation child node, a playback content starting from an operation corresponding to the operation child node is played in the playback interface. Alternatively, after receiving a first interaction operation for a certain operation child node, only a playback content corresponding to the operation child node is played in the playback interface.

To sum up, according to the live video-based interaction method provided by the embodiments of this application, by displaying the node implication area in event that the video content conforms to the event excerpting condition, the livestreaming condition of the current live video is indicated with the node implication area, the form of interaction between the viewer and the live video is enriched, and the viewer may learn the video content and livestreaming condition in the node indication area, and further interact in the node indication area, which improves the interaction efficiency between the viewer and the live video.

Figure 6:
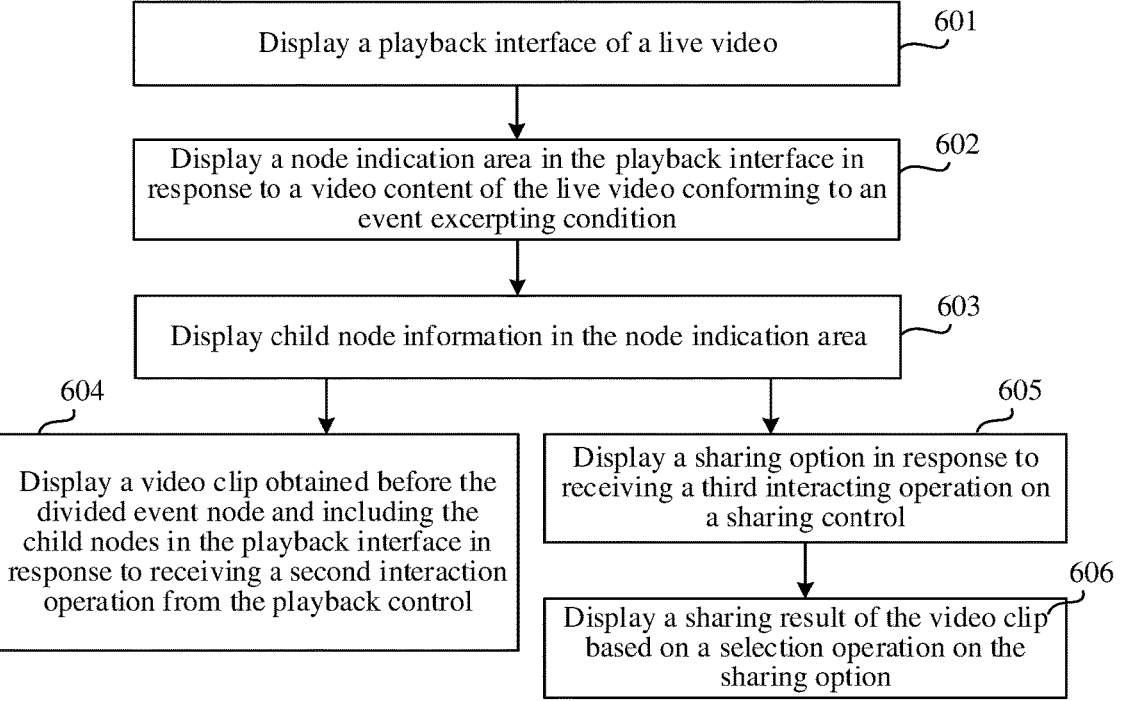
FIG. 6 is another flowchart of a live video-based interaction method according to an exemplary embodiment of this application.

In some embodiments, the node indication area includes a playback control and a sharing control. FIG. 6 is a flowchart of a live video-based interaction method according to an exemplary embodiment of this application. The following describes by taking the method being executed by the terminal device as an example. As shown in FIG. 6, the method includes the following steps (601-606):

Step 601: Display a playback interface of a live video.

The playback interface is used for playing the live video.

In some embodiments, a video frame picture includes a picture collected by a livestreamer terminal or a picture generated by a livestreamer terminal. For example, in event that the live video refers to a show video of a livestreamer user, the video frame picture includes the picture collected by a camera of the livestreamer terminal. In event that the live video refers to a game competitive video, the video frame picture includes the game picture displayed by the livestreamer terminal itself.

Step S602: Display a node indication area in the playback interface, in response to a video content of the live video conforming to an event excerpting condition.

The event excerpting condition is used for indicating, according to the video content, classifying an event node in the live video.

The node indication area is an area superimposed on the playback interface, or an area separated from the playback interface.

In some embodiments, the node indication area is displayed in a boundary area of the playback interface, In some embodiments, the node indication area is displayed once the live video finds the content conform to the event excerpting condition and classifies the event node; or, the node indication area is displayed when the live video classifies the event node and receives area display operation.

Step 603: Display child node information in the node indication area.

The child node information is used for indicating correspondence to the divided event node, and triggering display of a child node of the video content. That is, a plurality of child nodes are involved in the process of displaying the video content.

In some embodiments, taking the game live video as an example, the child node information includes the operation child nodes corresponding to recent n operations executed before the livestreamer account completes the target task, and n is a positive integer. For example, the server keeps recording recent 50 operations of a livestreamer account in the game process, and in event that the livestreamer account triggers the kill highlight, 5 operations before triggering the kill highlight are displayed as operation child nodes in a node indication area.

In other embodiments, taking the game live video as an example, the child node information includes operation child nodes corresponding to the operations with the specified type of operation as the start operation before the livestreamer account completes the target task. For example, the server keeps recording recent 50 operations of the livestreamer account in the game process, determines a recent moment of triggering a skill A by the livestreamer account before the livestreamer account triggers the kill highlight, and displays the operation child nodes corresponding to the operations starting from the moment of triggering the skill A in the node indication area.

In other embodiments, taking the game live video as an example, the child node information includes the operation child node corresponding to the specified type of operation triggered before the livestreamer account completes the target task. For example, the server keeps recording recent 50 operations of the livestreamer account in the game process, including operations of the livestreamer account for controlling a virtual object to move, attack and use a skill. In event that the livestreamer account triggers the kill highlight, the operations of the livestreamer account for controlling the virtual object to use a skill among 20 recent operations are determined, and the operation child nodes corresponding to the operations controlling the virtual object to use a skill are displayed in the node indication area.

The foregoing approach of determining the operation child nodes are merely examples, which is node limited in the embodiments of this application.

Step 604: Play a video clip obtained before the divided event node and including the child nodes in the playback interface in response to receiving a second interaction operation from the playback control.

In some embodiments, the video clip refers to a clip starting from the video moment corresponding to a first divided child node to the divided event node; or, the video clip refers to a clip obtained by intercepting a preset length of video forward with the divided event node as the end moment; or, the video clip refers to a clip that takes the divided event node as the end moment and intercepts the video according to the characteristics of the event node itself. For example, if the event node is set to a kill highlight of One Kill, the intercepted clip lasts for 5 seconds (including the process of One Kill). If the event node is set to a kill highlight of Triple Kill, the intercepted clip lasts for 10 seconds (including the process of One Kill, Double Kill, and Triple Kill). The specific intercepted duration is preset according to experience or determined by recognizing the video picture. Alternatively, the video clip may also be determined in other ways, which are not limited in the embodiments of this application.

In some embodiments, when receiving a second interaction operation on the playback control, the video clip is played back, and the event corresponding to the event node is played back.

In some embodiments, when receiving the second interaction operation on the playback control, the video clip is directly played in full screen (i.e., full screen) of the playback interface; or a playback window is superimposed on the playback interface (such as a floating video window), and the video clip is played in the playback window.

In event that the video clip is played in the playback window, the video clip in the playback window and the live video played in the playback interface are played simultaneously; or in event that the video clip is played in the playback window, the live video is paused to play, and the playback of the live video is resumed once the video clip is played.

Figure 7:
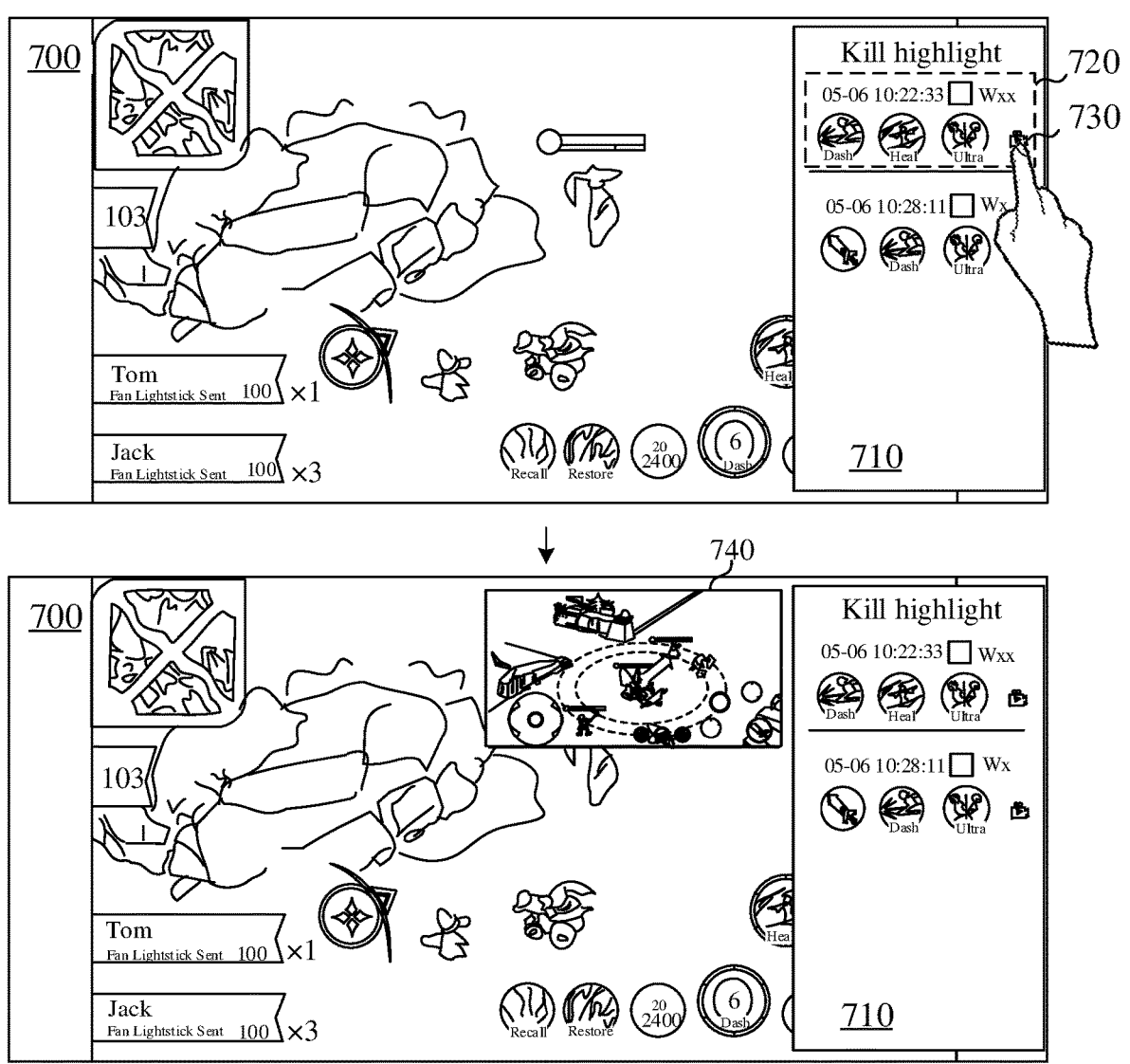
FIG. 7 is a schematic diagram of a playback interface according to the embodiment as shown in FIG. 6.

For example, FIG. 7 is a schematic diagram of a playback interface according to an exemplary embodiment of this application. As shown in FIG. 7, a node indication area 710 is displayed in a playback interface 700. The node indication area 710 displays a divided event node 720, and the event node 720 includes operation child nodes. The event node 720 further includes a corresponding playback control 730. When receiving a second interaction operation on the playback control 730, a playback window 740 is superimposed in the playback interface 700, and a video clip corresponding to the event node 720 is played in the playback window 740. The video clip includes the operation implementation process corresponding to the operation child nodes.

Step 605: Display a sharing option in response to receiving a third interaction operation on a sharing control.

In some embodiments, the node indication area further includes a sharing control. The sharing control is used for indicating sharing an event corresponding to the event node; or, the sharing control is used for indicating sharing the video clip corresponding to the event node; or, the sharing control is used for indicating sharing a live show corresponding to the live video based on the event node.

The sharing option is used for selecting a sharing channel.

The following is described by taking the sharing control for indicating sharing the video clip corresponding to the event node as an example. That is, the sharing option is used for indicating a sharing path for sharing the video clip.

The sharing option includes at least one of the following:

First, the sharing option includes an option of a contact in a preset application, that is, a contact that receives sharing in the preset application is selected.

Second, the sharing option includes two levels of path selection, where the first level of path selection is used for selecting an application to be shared, and the second level of path selection is used for selecting a contact that receives sharing in the application.

For example, the first sharing option is displayed in response to receiving the third interaction operation on the sharing control, including candidate applications installed in the current terminal device and having the function of receiving sharing. The user selects a target application from the candidate applications as an application for receiving sharing, so as to display the second sharing option. The second sharing option includes a candidate contact of the user in the target application. The candidate contact refers to a contact having a two-way association relationship with the user in the target application (that is, both the user and the contact may contact with each other); or, the candidate contact refers to a contact having a one-way association relationship with the user in the target application (that is, only the current user may actively contact, but the other party cannot actively contact the current user).

Step 606: Display a sharing result of the video clip based on a selection operation of the sharing option.

The sharing result includes a sharing success result and a sharing failed result. That is, the sharing result includes two possibilities, i.e., sharing successfully and sharing failed.

Figure 8:
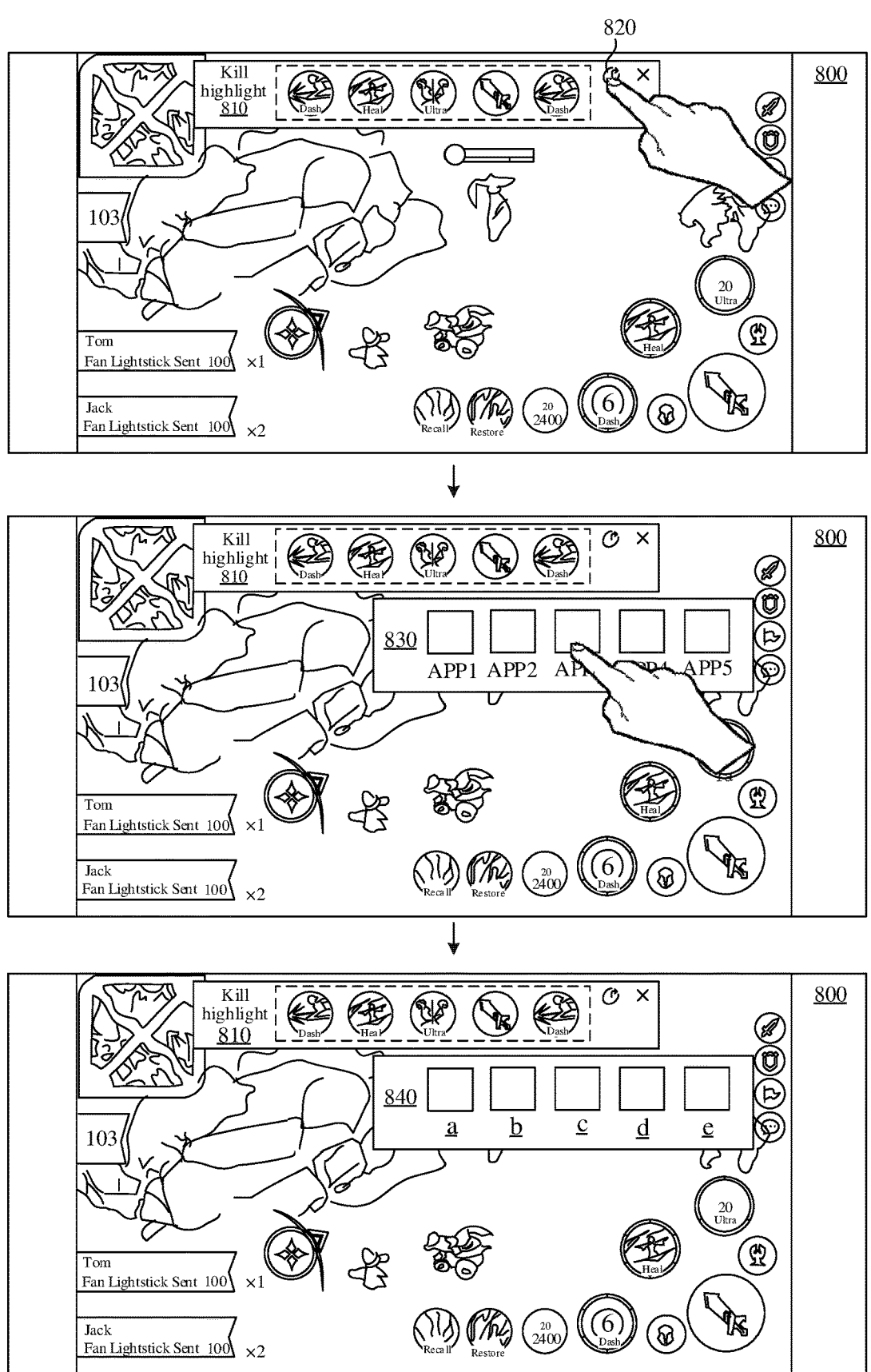
FIG. 8 is a schematic interface diagram of a sharing process according to the embodiment as shown in FIG. 6.

For example, FIG. 8 illustrates a schematic interface diagram of a sharing process according to an exemplary embodiment of this application. As shown in FIG. 8, a playback interface 800 includes a node indication area 810. The node indication area 810 includes a sharing control 820. When receiving an operation for the sharing control 820 (such as a click operation), a first sharing option 830 is displayed, where the first sharing option 830 includes an icon of a candidate application. When receiving a selection operation for the target application, a second sharing option 840 is displayed, where the second sharing option 840 includes a portrait and/or an Identity Document (ID) of the candidate contact. According to the selection of the target contact among the candidate contacts, the shared content is transmitted, that is, the shared content is transmitted to the target contact.

In some embodiments, the shared content includes at least one of the following: a link corresponding to the event node, a video clip corresponding to the event node, a live show link corresponding to the event node, a playback interface screenshot at the moment of dividing the event node, and so on, which is not limited in the embodiments of this application.

In sum, according to the live video-based interaction method provided by the embodiments of this application, by displaying the node implication area when the video content conforms to the event excerpting condition, the livestreaming condition of the current live video is indicated with the node implication area, the form of interaction between the viewer and the live video is enriched, and the viewer may learn the video content and livestreaming condition in the node indication area, and may further interact in the node indication area, which improves the interaction efficiency between the viewer and the live video.

According to the method provided by this embodiment, the playback control provides the user with the function of playing back a highlight clip of the live video conveniently. The user reviews the highlight clip of the live video corresponding to the event node through the playback control, which improves the human-machine interaction efficiency.

In some embodiments, the node indication area includes at least two display modes: directly displaying once the event node is divided and displaying when receiving an area display operation. FIG. 9 is a flowchart of a live video-based interaction method according to another exemplary embodiment of this application. Taking the method being executed by a terminal device as an example, as shown in FIG. 9, the method includes the following steps (901-905):

Step 901: Display a playback interface of a live video.

The playback interface is used for playing the live video.

In some embodiments, a video frame picture includes a picture collected by the livestreamer terminal or a picture generated by the livestreamer terminal. For example, in event that the live video refers to a show video of the livestreamer user, the video frame picture includes the picture collected by a camera of the livestreamer terminal. In event that the live video refers to a game competitive video, the video frame picture includes the game picture displayed by the livestreamer terminal itself.

Step 902: Display a first node indication area in the playback interface in response to a video content of the live video conforming to an event excerpting condition.

In some embodiments, the node indication area includes a first node indication area and a second node indication area.

In some embodiments, the first node indication area refers to an area displayed automatically in the playback interface after the event node is divided. In some of these embodiments, the first node indication area refers to an area displaying the divided event node, that is, child node information displayed in the first node indication area refers to the child node corresponding to the divided event node.

In some embodiments, taking the game live video as an example, if the livestreamer account reaches the kill highlight in the game process, and the kill highlight corresponds to the Penta Kill, the first node indication area is displayed. The first node indication area includes operation child nodes corresponding to the operations executed in the process that the livestreamer account reaches the Penta Kill. In some embodiments, the first node indication area further includes a sharing control used for sharing a kill highlight in the current live game video with other users.

In some embodiments, the display of the first node indication area in the playback interface is canceled upon a specified display duration is reached; or, the first node indication area includes a closing control used for canceling the display of the first node indication area in the playback interface when receiving a triggering operation on the closing control; or, the first node indication area is displayed in the playback interface, and in event that a next event node is divided, the current first node indication area is replaced by another first node indication area corresponding to a next event node.

In some embodiments, in event that the first node indication area fails to display all the child nodes, the child nodes are switched to display by sliding or switching. For example, the first node indication area displays at most 5 child nodes at a time (that is, at most 5 child nodes are displayed simultaneously), and in event that the event node corresponds to 8 child nodes, these child nodes are switched to display by means of list sliding or switching.

For example, the slide operation in the node indication area is received, and the child nodes are switched to display in a sliding mode according to the slide operation. That is, the child nodes are switched to display based on the slide operation.

Step 903: Display a second node indication area in the playback interface in response to receiving an area display operation.

The second node indication area refers to an area displayed according to the area display operation. The area display operation may be an operation triggered by an interface control in the playback interface, or an operation triggered directly from anywhere in the playback interface. For example, a long-press operation at anywhere in the playback interface is received, the long-press operation is used as the area display operation, and the second node indication area is displayed.

In some embodiments, as the second node indication area is actively triggered by the area display operation, the display content of the second node indication area includes any one of the following:

1. child node information corresponding to a recent divided event node is displayed in the second node indication area;
2. child node information corresponding to a divided event node of the current game is displayed in the second node indication area; and
3. child node information corresponding to m recent divided event nodes of the current game is displayed in the second node indication area.

The display contents of the second node indication area are merely examples, and are not limited in the embodiments of this application.

This embodiment is described by taking the child node information corresponding to the divided event node of the current game being displayed in the second node indication area as an example.

In some embodiments, at least two event nodes are divided in the live video, child node lists corresponding to the at least two event nodes are sequentially displayed in the node indication area based on an order of occurrence of the at least two event nodes, and the child node lists display child node information respectively corresponding to the at least two event nodes.

Figure 10:
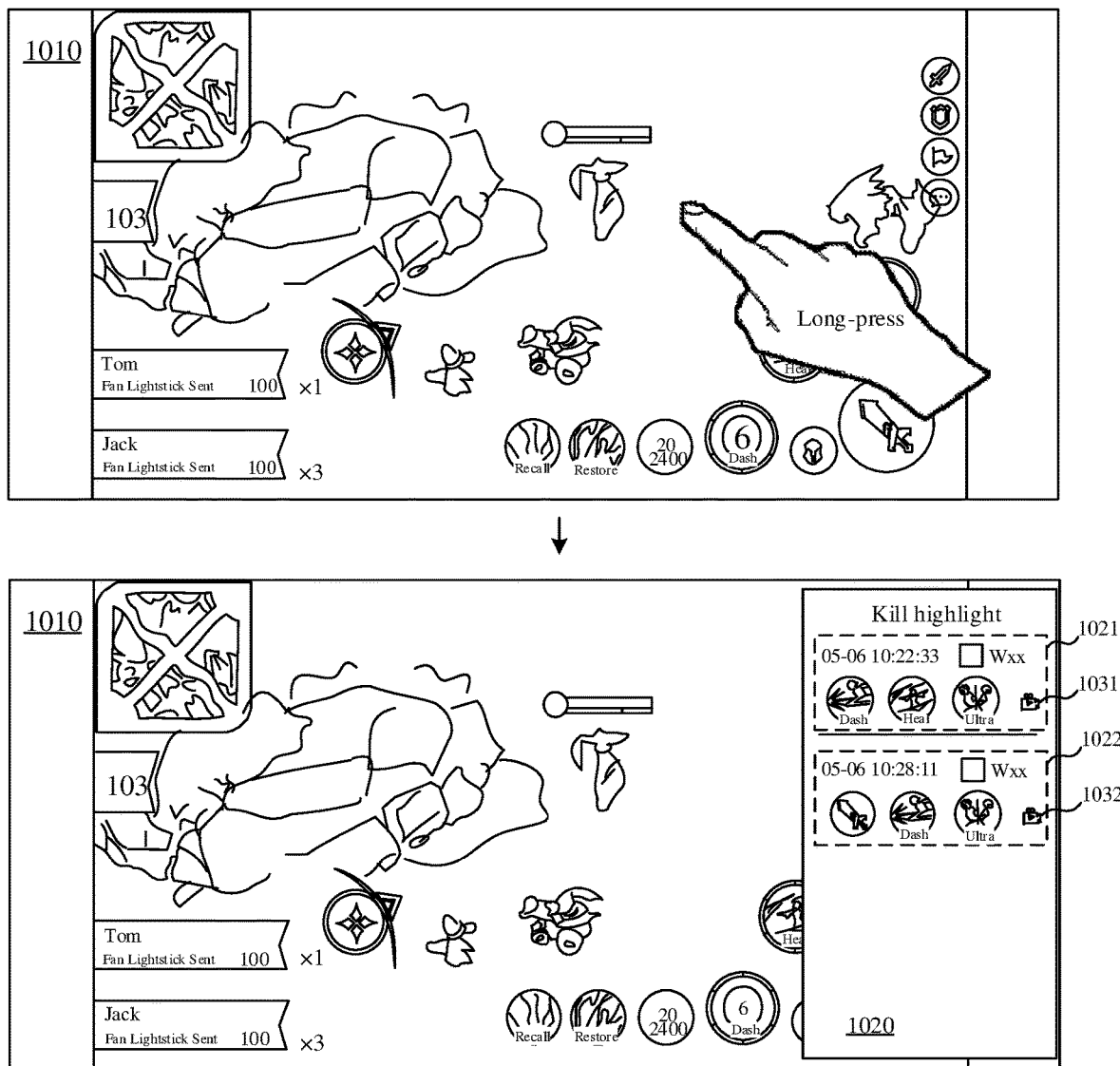
FIG. 10 is a schematic interface diagram of a second node indication area according to an exemplary embodiment of this application.

For example, FIG. 10 is a schematic interface diagram of a second node indication area according to an exemplary embodiment of this application. As shown in FIG. 10, in event that a user executes a long-press operation anywhere in a playback interface 1010, a second node indication area 1020 is displayed. The second node indication area 1020 includes a child node list 1021 and a child node list 1022. The child node list 1021 corresponds to a first event node (a first kill highlight) divided in a live video, and includes each child node corresponding to the first event node. The child node list 1022 corresponds to a second event node (a second kill highlight) divided in the live video, and includes each child node corresponding to the second event node.

In some embodiments, the child node list 1021 is further provided with a playback control 1031 correspondingly. The playback control 1031 is used for playing back a video clip corresponding to the first event node. The child node list 1022 is further provided with a playback control 1032 correspondingly. The playback control 1032 is used for playing back a video clip corresponding to the second event node.

In some embodiments, the child node list 1021 further includes a moment of dividing the first event node, and a game character applied (used) by a livestreamer when dividing the first event node. The child node list 1022 further includes a moment of dividing the second event node, and a game character applied (used) by the livestreamer when dividing the second event node.

Step 904: Display child node information in the node indication area.

In some embodiments, the child node information is used for indicating correspondence to the divided event node, and triggering display of the child node of the video content. That is, a plurality of child nodes are involved in the process of displaying the video content.

Step 905: Display an interaction result based on an interaction operation in response to receiving the interaction operation from the node indication area.

In some embodiments, the interaction operation includes operations such as closing the node indication area, sharing the node indication area, playing back a video clip corresponding to the node indication area.

For example, the following is described for the first node indication area and the second node indication area respectively.

Figure 11:
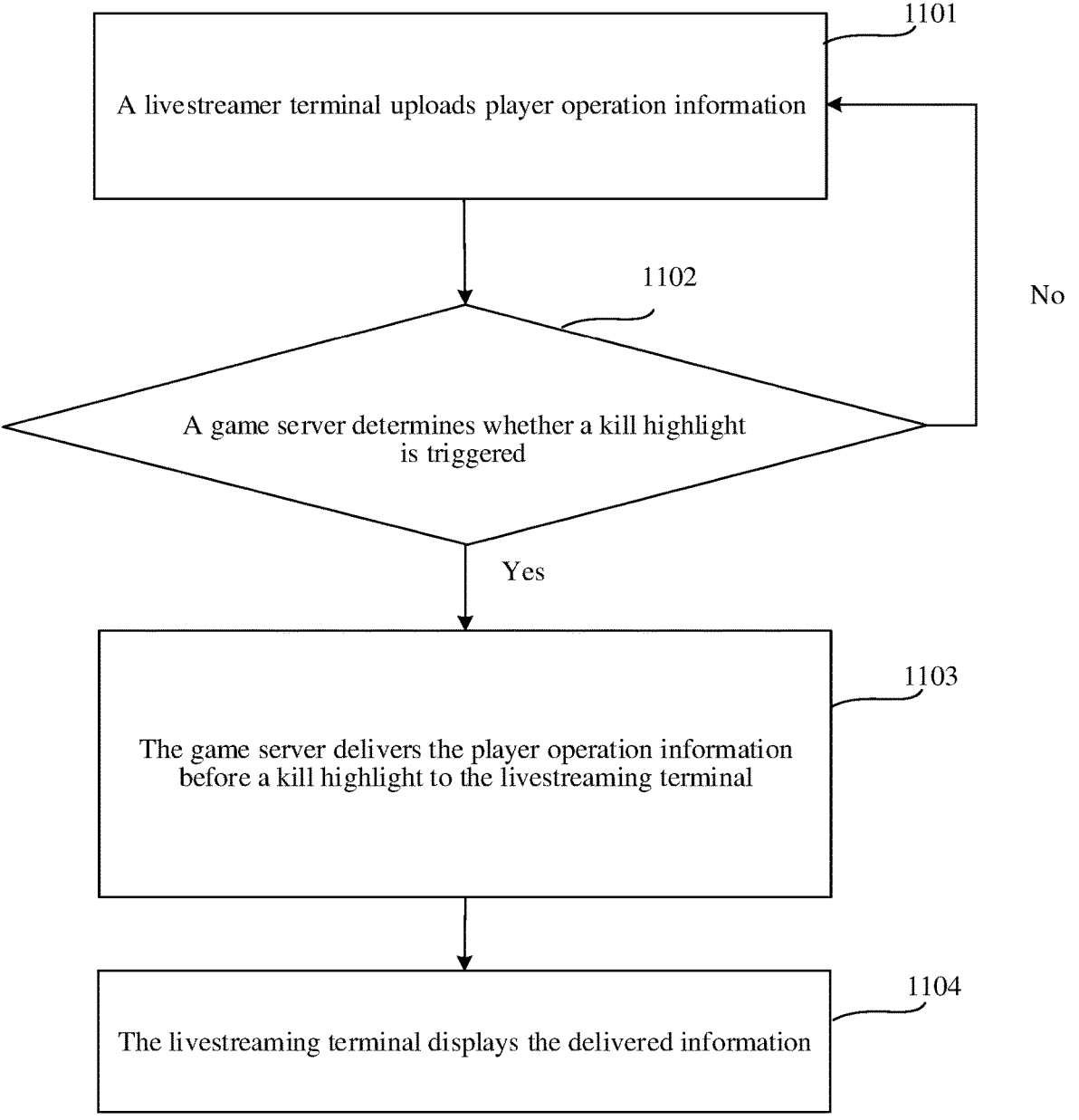
FIG. 11 is a schematic diagram of a display process of a first node indication area according to an exemplary embodiment of this application.

First node indication area: referring to FIG. 11, the display process of the first node indication area includes the following steps (1101-1104):

Step 1101: A livestreamer terminal uploads player operation information.

The livestreamer terminal refers to a terminal device used by the livestreamer to participate in the game in the current operation. In the process that the livestreamer participates in the game, the livestreamer terminal keeps uploading player operation information corresponding to the operation executed by the player to a game server.

Step 1102: A game server determines whether a kill highlight is triggered.

As the game server is configured to compute and process game data in the game process, the game server determines whether the livestreamer terminal triggers a kill highlight currently in real time. For example, the server determines whether the livestreamer account triggers One Kill, Double Kill, Triple Kill, Quadra Kill or Penta Kill currently in real time.

Step 1103: The game server delivers the player operation information before the kill highlight to the livestreaming terminal.

In event that the game server determines that the livestreamer terminal triggers the kill highlight, the operations executed by the livestreamer terminal before the kill highlight are transmitted to the livestreaming terminal (that is, a terminal device viewing the live video of the livestreamer terminal).

Step 1104: The livestreaming terminal displays the delivered information.

In the process that the first node indication area displays the triggering, since the display of the first node indication area is directly triggered according to the kill highlight, the delivered player operation information is displayed in the form of a child node in the first node indication area after the game server delivers the player operation information.

Figure 12:
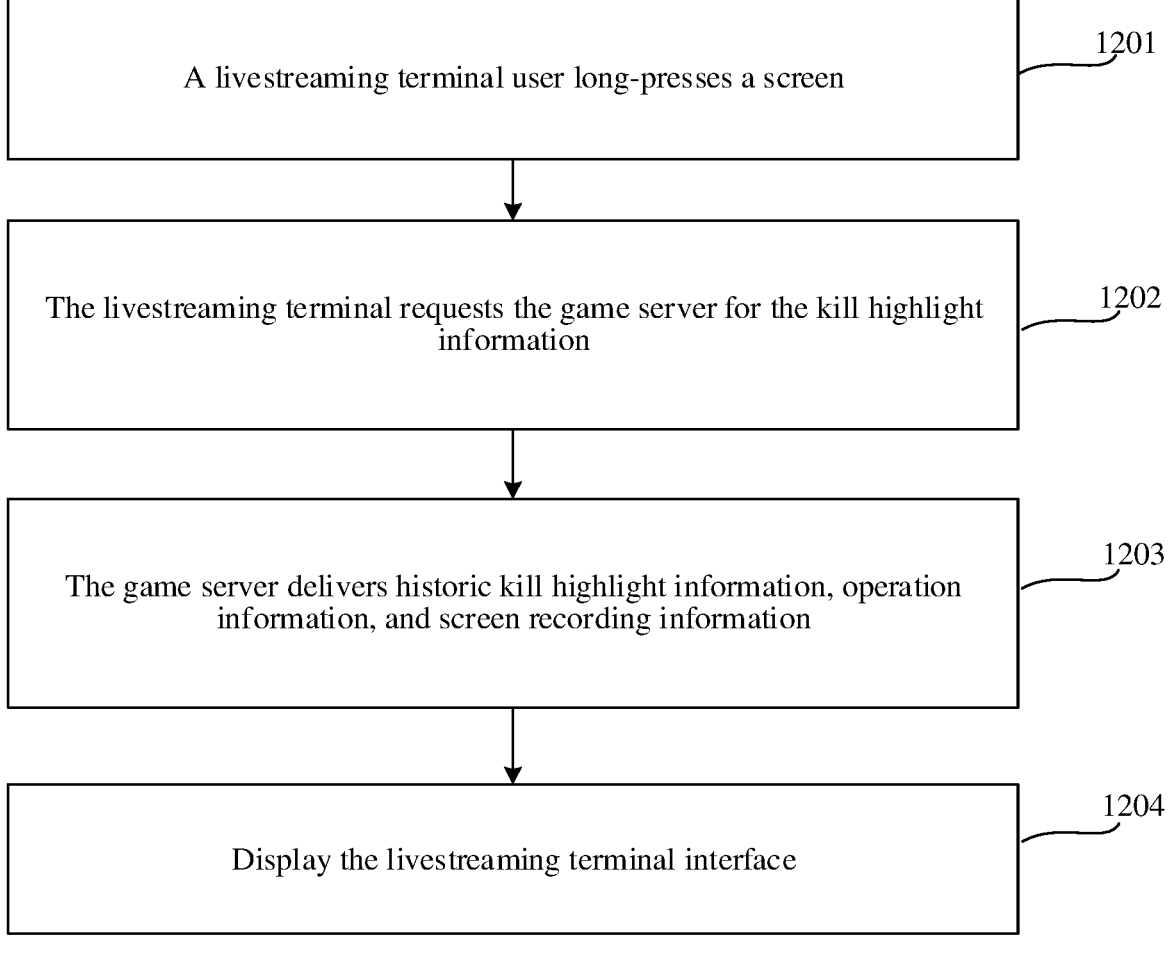
FIG. 12 is a schematic diagram of a display process of a second node indication area according to an exemplary embodiment of this application.

Second node indication area: referring to FIG. 12, the display process of the second node indication area includes the following steps (1201-1204):

Step 1201: A livestreaming terminal user long-presses a screen.

In some embodiments, the user performs the long-press operation anywhere in the playback interface of the live video, to trigger the display of the second node indication area.

Step 1202: The livestreaming terminal requests the game server for the kill highlight information.

In some embodiments, when receiving the long-press operation, the livestreaming terminal determines the need of displaying the second node indication area and requests the game server for related information of the kill highlight.

Step 1203: The game server delivers historic kill highlight information, operation information, and screen recording information.

The kill highlight information includes a triggering moment of the kill highlight, a game character applied by the livestreamer in event that the kill highlight is triggered, a kill highlight type corresponding to the kill highlight, and so on. The operation information includes operations executed by the livestreamer during triggering the kill highlight, including a skill operation, a control operation, an attack operation and so on. The screen recording information includes the video clip obtained by the related screen recording of the kill highlight.

Step 1204: Display the livestreaming terminal interface.

The second node indication area is displayed after the livestreaming terminal obtains the kill highlight information.

When receiving sequence information about kill operations of the kill highlight delivered by a backend server, the livestreaming terminal Websocket displays the player operation process via a CollecionView control, and displays in a left-right slide mode if a specified skill amount is reached. Skill icons and detailed information are stored locally, so that local data is searched and displayed according to the delivered skill ID.

In sum, according to the live video-based interaction method provided by the embodiments of this application, by displaying the node implication area in event that the video content conforms to the event excerpting condition, the livestreaming condition of the current live video is indicated with the node implication area, the form of interaction between the viewer and the live video is enriched, and the viewer may learn the video content and livestreaming condition in the node indication area, and may further interact in the node indication area, which improves the interaction efficiency between the viewer and the live video.

The method according to this embodiment displays different node indication areas according to different triggering conditions. As a result, the method indicates the event nodes from different dimensions and improves the human-machine interaction efficiency.

Figures 13, 14:
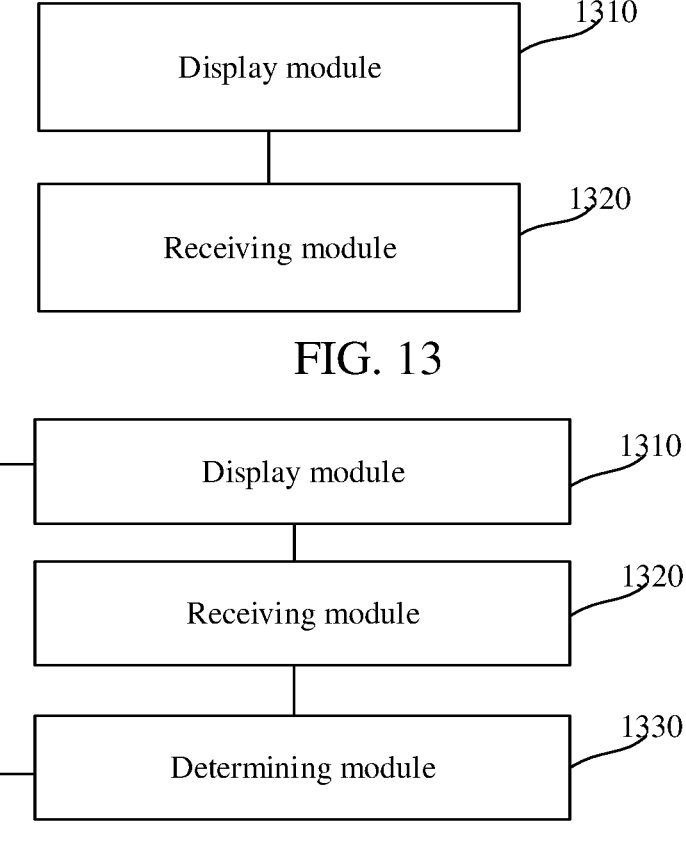
FIG. 13 is a structural block diagram of a live video-based interaction apparatus according to an exemplary embodiment of this application.
FIG. 14 is another structural block diagram of a live video-based interaction apparatus according to an exemplary embodiment of this application.

FIG. 13 is a structural block diagram of a live video-based interaction apparatus according to an exemplary embodiment of this application. As shown in FIG. 13, the apparatus includes a display module 1310 and a receiving module 1320.

The display module 1310 is configured to display a playback interface of a live video. The playback interface is used for playing the live video.

The display module 1310 is further configured to display a node indication area in the playback interface in response to a video content of the live video conforming to an event excerpting condition. The event excerpting condition is used for indicating division of an event node in the live video based on the video content.

The display module 1310 is further configured to display child node information in the node indication area, the child node information being used for indicating correspondence to the divided event node, and trigger display of a child node of the video content. The child node is used for indicating an operation corresponding to the event node.

The receiving module 1320 is configured to receive an interaction operation from the node indication area.

The display module 1310 is further configured to display an interaction result based on the interaction operation.

In some embodiments, the live video refers to a game live video in which a livestreamer account participates in a game.

The display module 1310 is further configured to display the node indication area in the playback interface in response to the video content of the game live video instructing the livestreamer account to complete a target task in the game.

In some embodiments, the display module 1310 is further configured to display operation child nodes in the node indication area. The operation child nodes are used for indicating operations executed by the livestreamer account in the process of completing the target task.

In some embodiments, as shown in FIG. 14, the apparatus further includes a determining module 1330.

The determining module 1330 is configured to determine an order of operations of a target account in the process of completing the target task.

The display module 1310 is further configured to sequentially display the operation child nodes corresponding to the operations in the node indication area based on the order of operations.

In some embodiments, the display module 1310 is further configured to play a playback content starting from the operations corresponding to the operation child nodes in the playback interface in response to receiving a first interaction operation from the operation child nodes.

In some embodiments, the node indication area further includes the moment when the livestreamer account completes the target task, or the node indication area further includes the game character used by the livestreamer account for completing a target task.

In some embodiments, the node indication area includes a playback control.

The display module 1310 is further configured to play a video clip obtained before the divided event node and including the child nodes in the playback interface in response to receiving a second interaction operation from the playback control.

In some embodiments, the node indication area includes a sharing control.

The display module 1310 is further configured to display a sharing option in response to receiving a third interaction operation on the sharing control, the sharing option being used for indicating a sharing path for sharing the video clip; and display a sharing result of the video clip based on a selection operation on the sharing option.

In some embodiments, at least two event nodes are divided in the live video.

The display module 1310 is further configured to sequentially display child node lists corresponding to the at least two event nodes in the node indication area based on an order of occurrence of the at least two event nodes, the child node lists displaying the child node information corresponding to the at least two event nodes.

In some embodiments, the receiving module 1320 is further configured to receive a slide operation from the node indication area.

The display module 1310 is further configured to switch display of the child nodes based on the slide operation.

In sum, according to the live video-based interaction apparatus provided by the embodiments of this application, by displaying the node implication area in event that the video content conforms to the event excerpting condition, the livestreaming condition of the current live video is indicated with the node implication area, the form of inter-action between the viewer and the live video is enriched, and the viewer may learn the video content and livestreaming condition in the node indication area, and may further interact in the node indication area, which improves the interaction efficiency between the viewer and the live video For the live video-based interaction apparatus according to the embodiments, division of the functional modules above is merely used as an example for description. In actual application, the functions above are allocated to different functional modules according to requirements, that is, an internal structure of the device is divided into different functional modules, so as to complete all or some of the functions above. In addition, the live video-based interaction apparatus according to the embodiments belongs to the same concept as the live video-based interaction method in the embodiments, and the specific implementation process is detailed in the method embodiments, and details are not repeated here.

Figure 15:
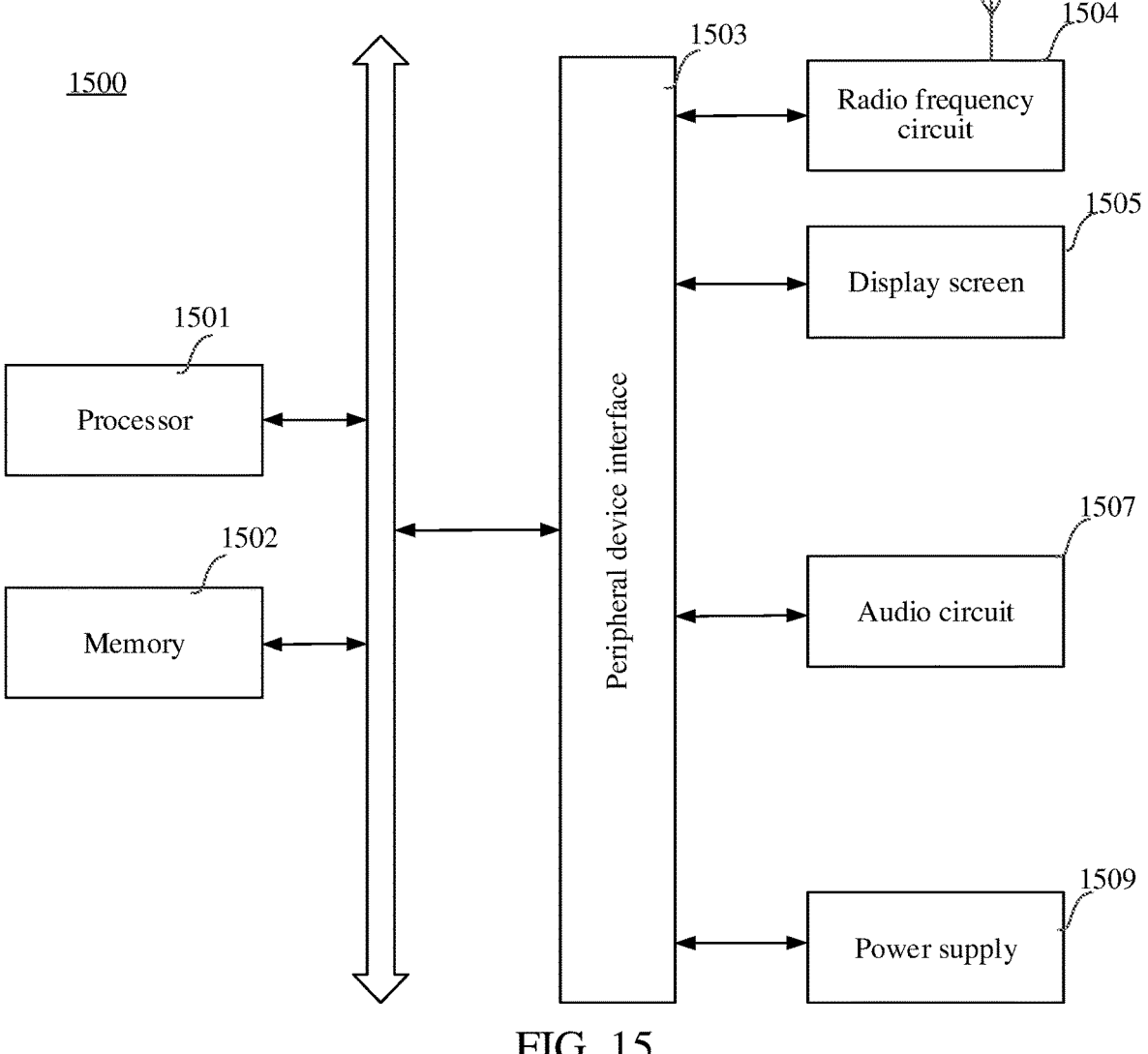
FIG. 15 is a structural block diagram of a terminal device according to an exemplary embodiment of this application.

FIG. 15 is a structural block diagram of a terminal device 1500 according to an exemplary embodiment of this application. The terminal device 1500 may be a portable mobile terminal, such as a smart phone, a tablet PC, a Moving Picture Experts Group Audio Layer III (MP3) player, a Moving Picture Experts Group Audio Layer IV (MP4) player, a laptop or a desktop computer. The terminal device 1500 may also be named as user equipment, a portable terminal, a laptop terminal, a desktop terminal and so on.

Generally, the terminal device 1500 includes a processor 1501 and a memory 1502.

The processor 1501 may include one or more processing cores, such as a 4-core processor, an 8-core processor and so on. The processor 1501 may be implemented in at least one of the following hardware forms: a Digital Signal Processing (DSP), a Field-Programmable Gate Array (FPGA), and a Programmable Logic Array (PLA). The processor 1501 may also include a main processor and a coprocessor. The main processor is a processor configured to process data in the wakeup state, also known as a Central Processing Unit (CPU). The coprocessor is a low-power processor config-ured to process data in a standby state. In some embodi-ments, the processor 1501 may be integrated with a Graphics Processing Unit (GPU), which is configured to render and draw the content that needs to be displayed on a display screen. In some embodiments, the processor 1501 may further include an Artificial Intelligence (AI) processor, which is configured to process a computing operation related to machine learning.

The memory 1502 may include one or more computer-readable storage media, which may be non-transitory. The memory 1502 may also include a high-speed random access memory and a non-volatile memory, such as one or more magnetic disk storage devices and flash memory devices. In some embodiments, the non-transient computer-readable storage medium in the memory 1502 is configured to store at least one instruction, and the at least one instruction, when executed by the processor 1501, implements the live video-based interaction method according to the method embodi-ments of this application.

In some embodiments, the terminal device 1500 may optionally include a peripheral device interface 1503 and at least one peripheral device. The processor 1501, the proces-sor 1502 and the peripheral device interface 1503 are connected through a bus or a signal line. Each peripheral device may be connected to the peripheral device interface 1503 through the bus, the signal line or a circuit board. Specifically, the peripheral device includes at least one of a radio frequency circuit 1504, a display screen 1505, an audio circuit 1507 and a power supply 1509.

A person skilled in the art may understand that, the structure as shown in FIG. 15 does not constitute a limitation to the terminal device 1500, and may include more or fewer components than those shown in the figure, or combine some components, or adopt different component arrange-ments.

For the live video-based interaction apparatus according to the embodiments, division of the functional modules above is merely used as an example for description. In actual application, the functions above are allocated to different functional modules according to requirements, that is, an internal structure of the device is divided into different functional modules, so as to complete all or some of the functions above. In addition, the live video-based interaction apparatus according to the foregoing embodiments belongs to the same concept as the live video-based interaction method in the foregoing embodiments, and the specific implementation process is detailed in the method embodi-ments, and details are not repeated here.

The embodiments of this application further provide a computer device, including a processor and a memory. The memory stores at least one instruction, at least one program, a code set or an instruction set. The at least one instruction, the at least one program, the code set or the instruction set is loaded and executed by the processor to implement the live video-based interaction method according to the method embodiments.

The embodiments of this application further provide a computer-readable storage medium having at least one instruction, at least one program, a code set or an instruction set stored thereon. The at least one instruction, the at least one program, the code set or the instruction set is loaded and executed by the processor to implement the live video-based interaction method according to the method embodiments.

The embodiments of this application further provide a computer program product or a computer program. The computer program product or the computer program includes computer instructions stored in a computer-read-able storage medium. A processor of a computer device reads the computer instructions from the computer-readable storage medium. The processor executes the computer instructions so that the computer device executes the live video-based interaction method according to any one of the foregoing embodiments.

In some embodiments, the computer-readable storage medium may include a Read Only Memory (ROM), a Random Access Memory (RAM) and a Solid State Drive (SSD), or an optical disc, etc. The RAM may include a Resistance Random Access Memory (ReRAM) and a Dynamic Random Access Memory (DRAM). The serial numbers of the foregoing embodiments of this application are merely for the purpose of description, and do not represent the merits of the embodiments.

The foregoing descriptions are merely preferred embodiments of this application, but are not intended to limit this application. Any modification, equivalent replacement, improvement and the like made within the spirit and principle of this application shall fall within the protection scope of this application.

What is claimed is:

1. A live video-based interaction method, executed by a terminal device, comprising:

displaying a playback interface for a game video;

displaying an indication area in the playback interface in response to a specified event happening in the game video, wherein the indication area disappears after a specified display duration;

displaying, in the indication area, interaction operations of a player associated with the specified event within a time window of the specified event; and playing, in response to receiving a selection of the interaction operations by a spectator, a playback content corresponding to the selected interaction operation in a playback window, the playback window being superimposed in the playback interface which continues to display the game video.

2. The method according to claim 1, wherein the game video is live.

3. The method according to claim 2, wherein the player is a livestreamer of the game video.

4. The method according to claim 1, wherein the playback interface is for the spectator to watch the game video.

5. The method according to claim 1, wherein the specified event is an achievement made by the player.

6. The method according to claim 5, wherein the time window is a period of time preceding the achievement being made.

7. The method according to claim 1, wherein the displaying the interaction operations comprises:

displaying a time sequence of the interaction operations of the player in the indication area.

8. The method according to claim 7, wherein the time sequence is displayed slidably.

9. The method according to claim 1, wherein the interaction operations of the player are displayed as icons representing the interaction operations.

10. The method according to claim 1 further comprising:

displaying a replay of a video segment of the game video.

11. The method according to claim 1 further comprising:

displaying a game character used by the player or a timestamp of the specified event.

12. A terminal device comprising:

a memory storing a plurality of instructions; and a processor configured to execute the plurality of instructions, and upon execution of the plurality of instructions, is configured to:

display, via a display, a playback interface for a game video;

display, via the display, an indication area in the playback interface in response to a specified event happening in the game video, wherein the indication area disappears after a specified display duration;

display, via the display in the indication area, interaction operations of a player associated with the specified event within a time window of the specified event; and playing, in response to receiving a selection of the interaction operations by a spectator, a playback content corresponding to the selected interaction operation in a playback window, the playback window being superimposed in the playback interface which continues to display the game video.

13. The terminal device according to claim 12, wherein the game video is live.

14. The terminal device according to claim 12, wherein the playback interface is for the spectator to watch the game video.

15. The terminal device according to claim 12, wherein the specified event is an achievement made by the player.

16. The terminal device according to claim 12, wherein in order to display the interaction operations, the processor, upon execution of the plurality of instructions, is configured to:

display, via the display, a time sequence of the interaction operations of the player in the indication area.

17. The terminal device according to claim 12, wherein the interaction operations of the player are displayed as icons representing the interaction operations.

18. The terminal device according to claim 12, wherein the processor, upon execution of the plurality of instructions, is further configured to displaying a replay of a video segment of the game video.

19. The terminal device according to claim 12, wherein the processor, upon execution of the plurality of instructions, is further configured to:

display a game character used by the player or a timestamp of the specified event.

20. A non-transitory computer readable storage medium storing a plurality of instructions executable by a processor, wherein upon execution by the processor, the plurality of instructions is configured to cause the processor to:

display, via a display, a playback interface for a game video;

display, via the display, an indication area in the playback interface in response to a specified event happening in the game video, wherein the indication area disappears after a specified display duration;

display, via the display in the indication area, interaction operations of a player associated with the specified event within a time window of the specified event; and playing, in response to receiving a selection of the interaction operations by a spectator, a playback content corresponding to the selected interaction operation in a playback window, the playback window being superimposed in the playback interface which continues to display the game video.

* * * * *